US008235657B2

(12) United States Patent
Bulin et al.

(10) Patent No.: US 8,235,657 B2
(45) Date of Patent: Aug. 7, 2012

(54) TURBOJET FOR AIRCRAFT

(75) Inventors: Guillaume Bulin, Blagnac (FR); Patrick Oberle, Verdun sur Garonne (FR)

(73) Assignee: Airbus Operations SAS, Toulouse (FR)

( * ) Notice: Subject to any disclaimer, the term of this patent is extended or adjusted under 35 U.S.C. 154(b) by 1048 days.

(21) Appl. No.: 11/766,286

(22) Filed: Jun. 21, 2007

(65) Prior Publication Data

US 2010/0028139 A1  Feb. 4, 2010

(30) Foreign Application Priority Data

Jun. 27, 2006 (FR) ..................................... 06 52654

(51) Int. Cl.
*F01D 5/08* (2006.01)
(52) U.S. Cl. .......... 415/176; 415/178; 60/39.83; 60/456
(58) Field of Classification Search .................. 415/176, 415/177, 178, 179, 47; 165/127, 177, 276, 165/280, 282, 283, 296, 297, 301, 101, 103; 244/57; 60/782, 39.76, 39.83, 456, 912, 60/39.08, 267
See application file for complete search history.

(56) References Cited

U.S. PATENT DOCUMENTS

| | | | | |
|---|---|---|---|---|
| 1,533,284 A * | 4/1925 | Verville | ........................ | 244/57 |
| 2,171,817 A * | 9/1939 | Wagner et al. | ............. | 123/41.31 |
| 2,423,175 A * | 7/1947 | Churchill et al. | ............. | 165/159 |
| 2,487,842 A * | 11/1949 | Whiteman et al. | ............. | 415/176 |
| 2,731,239 A * | 1/1956 | Andersen | ...................... | 165/299 |
| 4,120,150 A * | 10/1978 | Wakeman | ................. | 60/39.091 |
| 4,887,664 A * | 12/1989 | Nehrbauer | ....................... | 165/76 |
| 5,269,135 A * | 12/1993 | Vermejan et al. | ............ | 60/226.1 |
| 6,302,195 B1 * | 10/2001 | Kataoka | ..................... | 165/134.1 |
| 7,059,399 B2 * | 6/2006 | Chin et al. | ..................... | 165/177 |
| 2002/0005281 A1 * | 1/2002 | Krupa et al. | .................. | 165/177 |
| 2004/0182559 A1 * | 9/2004 | Kent et al. | ..................... | 165/183 |
| 2005/0161208 A1 * | 7/2005 | Sucke et al. | .................. | 165/177 |

FOREIGN PATENT DOCUMENTS

| | | |
|---|---|---|
| EP | 0315486 A2 | 5/1989 |
| EP | 0469825 A2 | 2/1992 |
| EP | 0469827 A1 | 2/1992 |
| EP | 0743434 A1 | 11/1996 |
| EP | 0924407 A2 | 6/1999 |
| GB | 2405181 A | 2/2005 |

\* cited by examiner

*Primary Examiner* — Dwayne J White
*Assistant Examiner* — Aaron R Eastman
(74) *Attorney, Agent, or Firm* — Perman & Green, LLP

(57) ABSTRACT

A turbojet for an aircraft includes an engine housed in a nacelle and a thermal exchanger that can be traversed by a hot fluid designed to be cooled by thermal exchange with a cold fluid external to the thermal exchanger. The thermal exchanger is disposed in an internal volume of the nacelle, between an internal wall of the nacelle and an external wall of the engine, in such a way as to present two thermal exchange surfaces in the flow of the air stream from the turbojet. The disclosed embodiments also relate to an aircraft equipped with such a jet turbine engine.

9 Claims, 2 Drawing Sheets

TURBOJET FOR AIRCRAFT

BACKGROUND

1. Field

The disclosed embodiments relate to a turbojet or turbojet engine for aircraft. More specifically, the disclosed embodiments relate to a thermal exchanger, also called a surface exchanger, housed in a turbojet. The thermal exchanger of the disclosed embodiments is designed for example to cool a fluid of the propulsion system of the turbojet, for example oil, so that it can be re-injected into said propulsion system in an at least partly cooled state. The disclosed embodiments also relate to an aircraft comprising at least one such turbojet.

In general, the thermal exchanger of the disclosed embodiments can be applied when a fluid designed to flow in a turbojet or on its periphery has to be cooled.

2. Description

There are known ways, in civil aviation, of using an ancillary thermal exchanger to cool the oil that circulates in the turbojet. The hot oil is conveyed to the thermal exchanger so as to be cooled therein before being re-utilized in the propulsion system.

FIG. 1 depicting the prior art provides a view in section of a turbojet 1 as well as two prior art thermal exchangers 6 and 12.

The turbojet 1 has a nacelle 2 housing an engine 3. The engine 3 is fixed to an inner wall 4 of the nacelle 4 by means of air bifurcations 5.

In the prior art, there are generally two possible ways of positioning the thermal exchanger: in the body of the engine 3 or in the nacelle 2.

When the thermal exchanger 6 is mounted in the body of the engine 3, it is more specifically housed in an internal volume 7 made between an engine hood 8 at least partially surrounding the engine 3, and the engine 3 itself. An air inlet 9 taps cold air from the cold air stream going through the turbojet 1, to convey it into the thermal exchanger 6. The cold air goes through the matrix of the thermal exchanger in which the hot oil to be cooled flows. The two fluids are separated from each other by partition walls and do not get mixed with each other. The calorific exchange takes place within the matrix. The partially heated air comes out of the thermal exchanger 6 through an air outlet 10 and is then re-injected into the secondary air stream coming out of the nacelle.

Should the thermal exchanger 12 be positioned at the nacelle 2, it is more specifically housed in the internal volume of said nacelle 2. An air inlet 13 taps cold air from the cold air stream going through the turbojet 1 to convey it into said thermal exchanger 12. After having crossed the matrix of the thermal exchanger 12, this airflow is either ejected out of the nacelle 2 by an air outlet 14 or re-introduced into the internal flow of the engine by a specific air outlet (not shown).

Thermal exchangers of this kind do not prove to be an optimum solution in terms of propulsion efficiency and aerodynamic impact on the engine. This is so for several reasons. When the air that goes through the matrix of the exchanger is expelled out of the internal flow of the engine, i.e. in the case of a mounting in the nacelle with an air outlet to the exterior, the tapping of air constitutes a direct loss of propulsion efficiency inasmuch as it makes no contribution or little contribution to the thrust of the engine. When the air that goes through the matrix of the thermal exchanger is re-introduced into the internal flow of the engine, in the case of a mounting in the body of the engine, the matrix of the thermal exchanger, by its internal architecture, induces a high loss of load in the flow and tends to create a disturbance of varying significance in the aerodynamic flow downstream from the engine. Besides, the presence of an air inlet and of one or more internal conduits as well as an air outlet gives rise to load losses and disturbs the internal flow of the engine to a variable extent.

Another known approach uses a plate-type exchanger. In particular, there is a known plate-type exchanger which locally matches the shape of the internal wall 4 of the nacelle 2 to which it is attached. An upper face of the thermal exchanger is attached to the inner wall 4 of the nacelle while a lower face is situated in the cold air stream that goes through the internal volume of the nacelle 2. The heat transported within the exchanger is transferred by thermal conduction to the internal face of the plate forming the lower face of said thermal exchanger. This hot plate is brushed against by the cold air stream flowing in the nacelle 2. The heat stored in the hot plate is thus dissipated by forced convection toward the aerodynamic flow of the turbojet 1.

One drawback of this second embodiment of a prior art thermal exchanger is that it is incompatible with the present-day systems for reducing sound nuisance coming out of the turbojet. Indeed, to reduce this sound nuisance, there are known ways of at least partially covering the internal wall for the nacelle 2 with an acoustic lining 11. More generally, this acoustic lining 11 covers the internal and external walls of the nacelle 2 and of the engine hood 8 when two of these walls are facing each other. The presence of this acoustic lining 11 is incompatible with the attachment of the plate-type thermal exchanger with the internal wall for the nacelle 2. In order to use such a plate-type thermal exchanger, it would be necessary to eliminate the acoustic lining 11 locally, and this proves to be difficult given the sizing criteria pertaining to sound nuisance.

The disclosed embodiments seek to provide a thermal exchanger capable of cooling a fluid such as oil or any other heat-conveying fluid playing a part in the propulsion system of the engine, that can be easily installed in a turbojet and adapts to current standards and constraints, especially acoustic standards and constraints. It is also sought to provide a thermal exchanger that has increased efficiency compared with the efficiency of the prior art thermal exchangers, i.e. has greater capacities of cooling.

To this end, the thermal exchanger of the disclosed embodiments are positioned in an internal volume of the nacelle of the turbojet without being attached either to the internal wall of the nacelle or to the external wall of the engine. Thus, the thermal exchanger of the disclosed embodiments have two thermal exchange surfaces, each of the surfaces being in contact with the flow of cold air going through the nacelle. The presence of these two thermal exchange surfaces increases the cooling capacities of said thermal exchanger. The thermal exchanger of the disclosed embodiments is positioned around the engine without being attached to it. The thermal exchanger of the disclosed embodiments are crossed by a hot fluid, such as hot oil. The heat thus transported within the thermal exchanger is transferred by thermal conduction to the internal surface of said thermal exchanger so as to be dissipated by forced convection towards the aerodynamic flow in which the thermal exchanger is immersed. The walls of the thermal exchanger are attached neither to the cold internal wall of the nacelle nor to the hot external wall of the turbojet. The thermal exchanger is optimized through the increase in surface area at which the thermal exchange can take place. Furthermore, no specific arrangement of the structures of the turbojet is necessary. The thermal exchanger is fitted to the nacelle without interfering with the existing structures.

SUMMARY

It would be advantageous to provide a turbojet for aircraft comprising an engine housed in a nacelle and a thermal exchanger that can be crossed by a hot fluid that is to be cooled by thermal exchange with a cold fluid external to the thermal exchanger, wherein the thermal exchanger is positioned in an internal volume of the nacelle, between an internal wall of the nacelle and an external wall of the engine so as to present at least two thermal exchange surfaces in the flow of the air stream from the turbojet.

The presence of the two thermal exchange surfaces optimizes the cooling capacities of the thermal exchanger according to the disclosed embodiments. Furthermore, the thermal exchanger of the disclosed embodiments is positioned at a distance from the internal wall of the nacelle and the external wall of the engine. It is therefore quite possible to maintain an acoustic lining if necessary on the walls of the turbojet.

Advantageously, the thermal exchanger of the disclosed embodiment is positioned around the engine, an internal contour of said exchanger at least partially following an external contour of said engine.

For example, the thermal exchanger has the general shape of a closed ring. In another embodiment, it can be planned to give the thermal exchanger the general shape of an arc of a circle, i.e. so that it covers not a 360° sector but a partial 90°, 180°, 240° sector or a sector with another value.

The general shape of the thermal exchanger of the disclosed embodiments as an open or closed circle of an arc may depend especially on the aerodynamic constraints and internal space of the propulsion system providing the fluid to be cooled as well as on the requirements for the cooling of said fluid. In particular, the greater the quantity of fluid to be cooled and/or the higher the temperature of the fluid to be cooled, the more worthwhile will it be to increase the exchange surface area of the thermal exchanger and hence to use a thermal exchanger with a general shape of a closed ring so as to increase the surface area to be traveled through by the fluid to be cooled.

Preferably, the thermal exchanger is positioned downstream from a fan.

In general, it is preferred not to place the thermal exchanger of the disclosed embodiments upstream from the fan owing to the aerodynamic constraints of the turbojet, since the physical presence of the thermal exchanger may disturb the flow at the level of the aerodynamic flow of the fan.

In one particular embodiment, the thermal exchanger has a faired oval section. The term "oval section" is understood to mean that the section has a small thickness relative to its length. The term "length" is understood to mean the dimension extending parallel to the longitudinal axis of the turbojet while the term "thickness" is understood to mean the dimension extending radially to the longitudinal axis of the turbojet. The term "faired" is understood more generally to mean an aerodynamic shape such that the flow of air in the nacelle is not disturbed.

The faired, oval ring shape of the thermal exchanger of the disclosed embodiments optimizes the thermal exchange surfaces while at the same time causing only the minimum disturbance in the flow of air since the volume of the body that can disturb said flow is minimized. The aerodynamic disturbances caused by the presence of the thermal exchanger itself are limited to the maximum extent.

For example, the thermal exchanger is fixedly joined to at least one bifurcation of the turbojet. Preferably, the thermal exchanger is at least fixedly joined to the upper bifurcation which separates the air stream going through the nacelle into two secondary air streams. It is also possible to fix the thermal exchanger to the outlet from the fan, on the guide blades of the turbojet, or fan rectifier.

The thermal exchanger may include a circuit for routing heat-transfer fluid such as oil or water, designed to route a heat-transfer fluid from the propulsion system of the engine up to the thermal exchanger and the cooled heat-transfer fluid from the thermal exchanger up to the propulsion system. Preferably, the heat-transfer fluid or liquid is neither corrosive nor inflammable.

The fluid to be cooled flows in an internal volume of the thermal exchanger, which may be divided into compartments according to the volume to be cooled for example.

In one alternative embodiment, all or part of the surfaces of the thermal exchanger that are not used for the exchange of heat may receive an acoustic surface treatment.

The disclosed embodiments also relates to an aircraft comprising at least one such turbojet. Advantageously, each of the turbojets of the aircraft conforms to the turbojet of the disclosed embodiment.

The disclosed embodiments will be understood more clearly from the following description and the accompanying figures. These figures are given by way of an indication and in no way restrict the scope of the embodiments. Of these figures:

FIG. 2 shows a turbojet 100 according to an embodiment.

Figure 1:
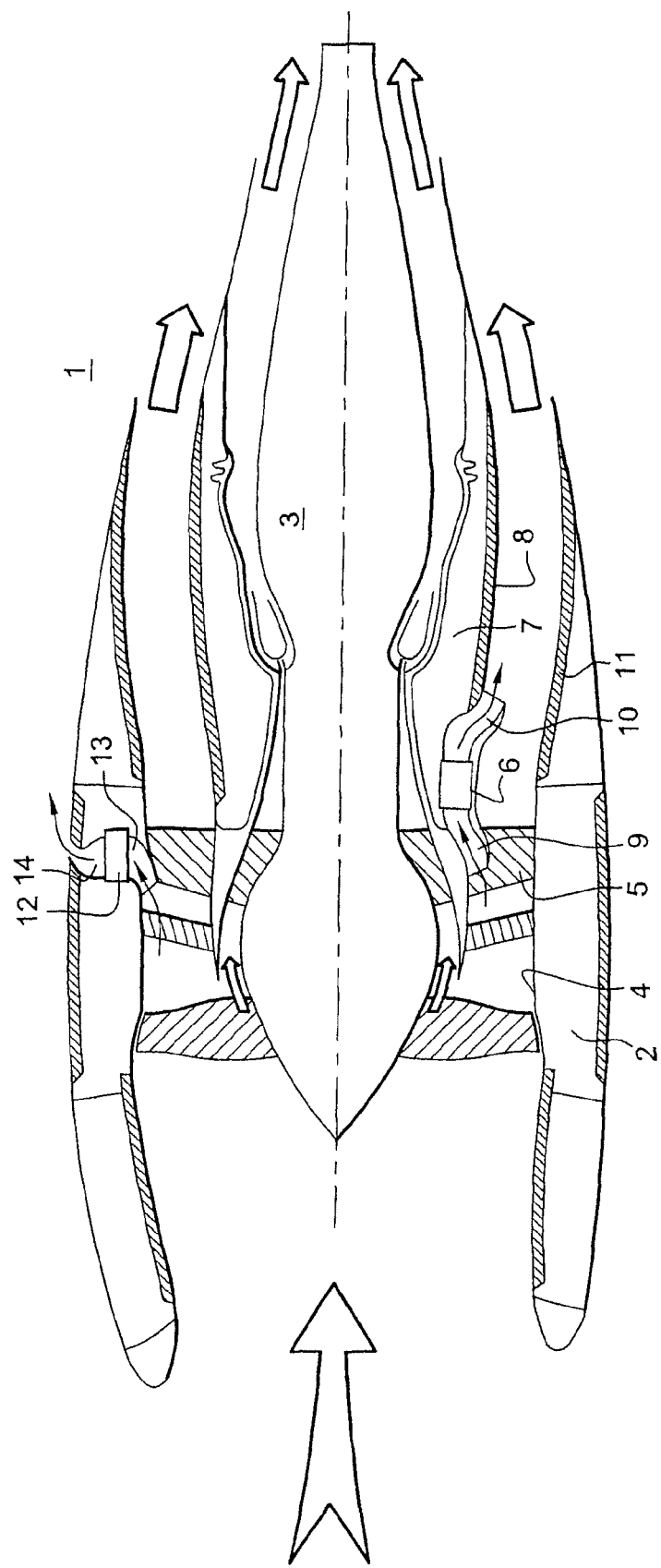
FIG. 1 is a cross-section of a turbojet provided with a prior art thermal exchanger already described.
Figure 2:
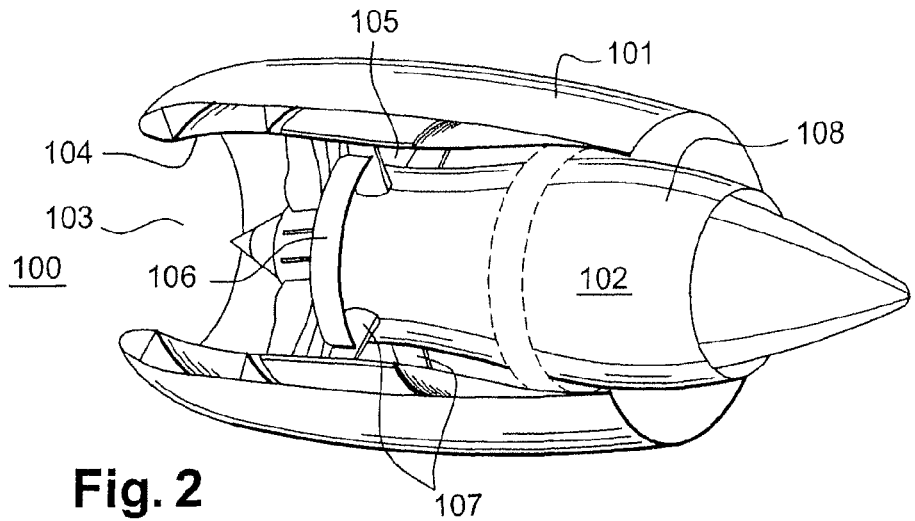
FIG. 2 is a cut-away view of a turbojet provided with two examples of thermal exchangers according to one embodiment.

The turbojet 100 has a nacelle 101 and an engine 102. The engine 102 is housed in an internal volume 103 of the nacelle 101. The engine 102 is fixedly joined to an internal wall 104 of the nacelle, especially by means of a longitudinal bifurcation 105.

A circular thermal exchanger 106 is housed in the internal volume 103 of the nacelle 101. As can be seen more clearly in FIG. 4, the thermal exchanger 106 is fixedly joined to the nacelle 101 and to the engine 102 by the longitudinal bifurcation 105 and the radial guiding blades 107.

Figure 4:
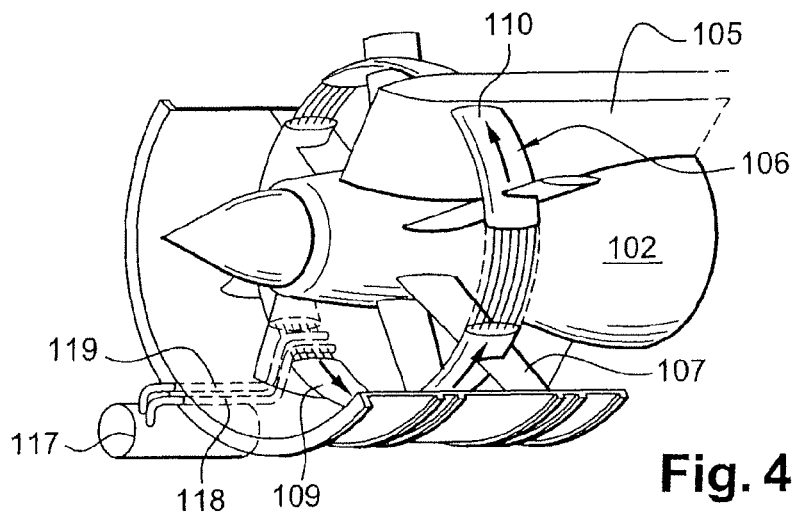
FIG. 4 is a schematic view of a device for routing fluid to be cooled and a thermal exchanger according to an embodiment.

The thermal exchanger 106 is positioned downstream from the fan channel of the turbojet, at the guiding blades 107 but, as is shown by dashes in FIG. 4, it could also be positioned further to the rear in the nacelle 101. In this case, the thermal exchanger 106 can be joined to the turbojet 100 by means of the longitudinal bifurcation 105 and/or by added-on through-hole-mounted struts (not shown) used to connect the thermal exchanger to the inner wall 104 of the nacelle 101 and/or to the external wall 108 of the engine 102.

The thermal exchanger 106 has a lower surface 109 and an upper surface 110, both designed to be brushed against by the air stream crossing the nacelle 101. The term "lower surface" is understood to mean the surface or external wall of the thermal exchanger pointing toward the engine and the term "upper surface" is understood to mean the surface or wall of the thermal exchanger pointing toward the internal wall of the nacelle. Neither the lower surface 109 nor the upper surface 110 of the thermal exchanger 106 are attached to another surface, whether cold or hot, of the turbojet 100. These two hot surfaces 109, 110 are both cooled by the air stream going through the nacelle 101. This cooling of the walls 109, 110 enables the cooling, by conduction, of the fluid flowing in the internal volume of the thermal exchanger 106.

Figures 3A, 3B, 3C:
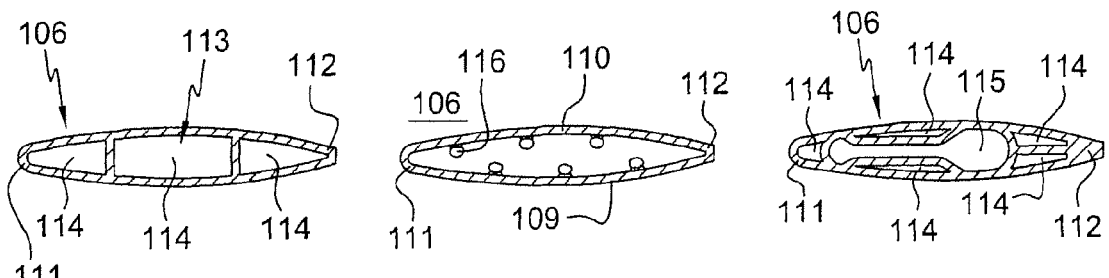
FIGS. 3A, 3B, 3C show three examples of ovoid sections of thermal exchangers according to one embodiment.

FIGS. 3A, 3B and 3C show three exemplary embodiments of an arrangement of the internal volume 113 of the thermal exchanger 106.

In all three cases, the section of the thermal exchanger 106 has a general shape that is faired and oval, i.e. an aerodynamic shape. The leading edge 111, as well as the trailing edge 112 of said thermal exchanger 106 are tapered so as not to disturb the aerodynamic flow inside the nacelle 101.

The internal volume 113 of the thermal exchanger 106 is advantageously sub-divided into several compartments 114 (FIGS. 3A, 3C) so as to adapt the volume in which the fluid to be cooled flows to the available volume of fluid. Advantageously, each of the compartments 114 designed to be crossed by the fluid to be cooled has at least one wall formed by an exchange surface 109, 110 of the thermal exchanger 106. Thus, in the example shown in FIG. 3C, the central compartment 115 which has almost no contact with the exchange surfaces 109, 110 is advantageously not crossed by the fluid to be cooled.

FIG. 3B shows another example of an embodiment of the division into compartments of the internal volume 113 of the thermal exchanger 106. Tubes 116, in which the liquid to be cooled is to flow, are arranged in the internal volume 113 of the thermal exchanger 106, attached to the inner wall of the exchange surfaces 109, 110. This approach is particularly suitable when only very small quantities of fluid have to be cooled in the thermal exchanger. The tubes 116 are for example soldered or bonded to the inner wall of the exchange surfaces 109, 110.

In another exemplary embodiment, it can be planned to make a thermal exchanger 106 provided with two ovoid sections, one fitted into the other. A smaller section is housed in a larger section so as to create two internal volumes superimposed in the thermal exchanger. Only the outermost volume is designed to receive the fluid to be cooled.

FIG. 4 shows a device 117 for routing fluid, such as oil, coming from a propulsion system of the engine 102. The routing device 117 is provided with a hot fluid lead-in tube 118 conveying the hot oil under pressure into the thermal exchanger 106. The hot oil under pressure is injected into the internal volume 113 of the thermal exchanger 106, and goes through an entire perimeter of the internal volume 113 of said thermal exchanger 106.

During this routing, the hot oil is partially cooled by forced thermal conduction.

The partially cooled oil is then discharged from the thermal exchanger 106 by a discharge tube 119 bringing the partially cooled oil back into the routing device 117. The cooled oil is conveyed by the routing device 117 to the propulsion system in which it is re-utilized.

Using a thermal exchanger 106 with a general closed-ring shape increases the perimeter of said thermal exchanger 106 and therefore the time for which the liquid to be cooled stays in the exchanger, as well as the total surface area of contact between the liquid to be cooled and the thermal exchange surfaces 109, 110. This plays a role in providing better cooling for the tube.

However, when the quantity of fluid to be cooled is small, and/or when the available space in the internal volume of the nacelle 101 is insufficient, it can be planned to have a thermal exchanger with a general open-ring shape, i.e. the shape of an arc of a circle that does not completely encircle the engine 102.

The invention claimed is:

1. A turbojet for aircraft comprising:
   an engine housed in a nacelle; and
   a thermal exchanger designed to cool a hot fluid tapped in the propulsion system of the turbojet before the re-injection of said fluid, partially cooled, into said propulsion system, and
   an acoustic lining at least partially covering an internal wall of at least one of the nacelle or an external wall of the engine,
   wherein;
   the thermal exchanger is disposed in an internal volume of the nacelle, at a distance from the internal wall of the nacelle and the external wall of the engine, in such a way as to present at least two thermal exchange surfaces in the flow of a cold air stream going through the nacelle,
   the thermal exchanger is fixedly joined to the nacelle and the engine by longitudinal bifurcation and radial guiding blades, and
   internal volume of the thermal exchanger is divided into compartments selectable to adapt a volume of the thermal exchanger in which the fluid to be cooled flows to an available volume of the fluid to be cooled.

2. A turbojet according to claim 1, wherein the thermal exchanger has the general shape of a closed ring positioned around the engine.

3. A turbojet according to claim 1, wherein the thermal exchanger has the general shape of an arc of a circle positioned around the engine.

4. A turbojet according to claim 1, wherein the thermal exchanger has a faired, oval section.

5. A turbojet according to claim 1, wherein the thermal exchanger is positioned downstream from the fan.

6. A turbojet according to claim 1, wherein the thermal exchanger is fixedly joined to at least one bifurcation of the turbojet.

7. A turbojet according to claim 1, comprising a circuit for routing heat-transfer fluid such as oil or water, designed to route a heat-transfer fluid from the propulsion system of the engine up to the thermal exchanger and the cooled heat-transfer fluid from the thermal exchanger up to the propulsion system.

8. A turbojet according to claim 1, wherein the hot fluid that is to cross the thermal exchanger is oil.

9. An aircraft comprising at least one turbojet according to claim 1.

* * * * *